(12) United States Patent
Reynolds et al.

(10) Patent No.: US 10,106,370 B2
(45) Date of Patent: Oct. 23, 2018

(54) CABLE DRUM TRANSPORTATION AND HANDLING APPARATUS

(71) Applicant: Western Technology Services International, Inc., Casper, WY (US)

(72) Inventors: Frederick J. Reynolds, Casper, WY (US); Elvis E. Dean, Casper, WY (US); Charles M. Capps, Casper, WY (US); Wesley R. Mangus, Bar Nunn, WY (US)

(73) Assignee: Western Technology Services International, Inc., Mills, WY (US)

( * ) Notice: Subject to any disclaimer, the term of this patent is extended or adjusted under 35 U.S.C. 154(b) by 797 days.

(21) Appl. No.: 14/552,796

(22) Filed: Nov. 25, 2014

(65) Prior Publication Data

US 2015/0158692 A1 Jun. 11, 2015

Related U.S. Application Data

(60) Provisional application No. 62/016,998, filed on Jun. 25, 2014, provisional application No. 61/912,767, filed on Dec. 6, 2013.

(51) Int. Cl.
*B65H 75/42* (2006.01)
*B60P 3/035* (2006.01)
(Continued)

(52) U.S. Cl.
CPC ............ *B65H 75/425* (2013.01); *B60P 1/483* (2013.01); *B60P 3/035* (2013.01); *B65H 49/34* (2013.01);
(Continued)

(58) Field of Classification Search
CPC .. B65H 75/425; B65H 49/34; B65H 75/4481; B65H 2701/34; E21B 17/206; B60P 1/483; B60P 3/035; B60P 3/025; B60P 3/14; B25B 5/067; B25B 5/101; F16B 2/00; F16B 2/10; F16B 2/065; F21V 21/088; F16M 13/02; B60R 11/06; B62D 53/00; B62D 53/06

See application file for complete search history.

(56) References Cited

U.S. PATENT DOCUMENTS 4,091,946 A * 5/1978 Kraeft ................... B60P 1/48
242/128
4,228,967 A * 10/1980 Woodruff ............... B60P 3/035
242/390.5

(Continued)

*Primary Examiner* — William A. Rivera
(74) *Attorney, Agent, or Firm* — ColterJennings

(57) ABSTRACT

A cable drum transportation and handling apparatus for mounting, transporting and handling large cable drums includes a supporting structure, which supporting structure may be mounted on a truck or trailer. The apparatus includes stabilizers mounted to the supporting structure, a hydraulics control system and an operator station, a gravity drive having a drive wheel tire for turning the drum to spool cable in or out, and a hydraulic drive system for the gravity drive. An adjustable mechanism ensures firm connection between the tire and a cable drum, when a drum is mounted on the apparatus. A lever arm or bolt pattern puts more or less tension on the gravity drive, for engagement, by moving the drive up and down. Opposing hydraulically-operated lift arms pivotally mounted on an upper part of the supporting structure may be pivoted outwardly and rearwardly. The lift arms laterally close to grasp the drum. Mounts on the end of each arm have a center pin that inserts into the center axis of the drum and a pair of engagement pins that are inserted between the spokes of the drum to assist in holding the drum in place. The apparatus may also include a mounting bracket for a banding cart to hold banding for the cabling.

23 Claims, 21 Drawing Sheets

(51) Int. Cl.
B60P 1/48 (2006.01)
E21B 17/20 (2006.01)
B60R 9/06 (2006.01)
B65H 49/34 (2006.01)
B65H 75/44 (2006.01)

(52) U.S. Cl.
CPC ....... B65H 75/4481 (2013.01); E21B 17/206 (2013.01); B65H 2701/34 (2013.01)

(56) References Cited

U.S. PATENT DOCUMENTS

| | | | | |
|---|---|---|---|---|
| 4,575,303 | A * | 3/1986 | Lindell | B60P 3/035 414/430 |
| 4,701,098 | A * | 10/1987 | Bills | B60P 3/035 180/19.2 |
| 4,886,409 | A * | 12/1989 | Penner | A01D 87/127 242/557 |
| 5,366,171 | A * | 11/1994 | Kononov | B65H 49/32 242/422.2 |
| 5,509,770 | A * | 4/1996 | Burenga | A01D 87/127 242/557 |
| 5,897,073 | A * | 4/1999 | McVaugh | B60P 3/035 242/390.5 |
| 6,347,761 | B1 * | 2/2002 | Larson | B65H 49/32 242/390.5 |
| 8,021,097 | B2 * | 9/2011 | McVaugh | B60P 3/035 242/557 |
| 8,814,075 | B1 * | 8/2014 | Turner | B65H 75/446 242/403 |
| 2005/0109870 | A1 * | 5/2005 | Krise | B60P 1/6463 242/557 |
| 2014/0246467 | A1 * | 9/2014 | Hein | B60R 9/06 224/519 |

* cited by examiner

CABLE DRUM TRANSPORTATION AND HANDLING APPARATUS

CROSS-REFERENCE TO RELATED APPLICATIONS

This application claims priority based on U.S. Provisional Patent Application Ser. No. 61/912,767 filed Dec. 6, 2013 and titled "Cable Drum Transportation and Handling Apparatus" and based on U.S. Provisional Patent Application Ser. No. 62/016,998 filed Jun. 25, 2014 and titled "Cable Drum Transportation and Handling Apparatus," the disclosures of both of which are incorporated herein by this reference.

BACKGROUND

This disclosure relates to an improved apparatus for mounting, transporting and handling large drums of spooled heavy duty cable. In particular, the disclosure relates to a trailer or truck-mountable apparatus for transporting and handling (or rotating) large spools or drums of heavy electrical or other cabling.

Various devices have been produced for transporting and handling large drums of cabling. For example, cable handling devices have been mounted on large trucks or trailers. Mounting drums onto the truck involves backing the truck (or trailer) up to a point close to and in alignment with the drum. A mandrel or shaft is inserted through an opening that extends down the center of the drum cylinder. Lift arms on the truck (or trailer) are attached to the mandrel and braces may be affixed on the lift arms are put into contact with the ground, to support the lift arms. The drum is then raised up onto the truck. Typically, a hydraulic drive gear, direct drive gear, or a tire that is in contact with the drum may be used to rotate the drum, thereby either spooling cable out, or spooling cable back onto the drum.

Unfortunately, these prior devices have significant safety and design drawbacks. For example, use of the mandrel means that workers must manually lift and insert the mandrel into the drum, and the mandrels often weigh over one hundred pounds. The mandrel can also be damaged or lost, resulting in the drum trailer or truck shutting down until the mandrel is repaired or a new mandrel found. Not only does this result in the risk of injury to workers, but different size mandrels must be available for different sizes of drums.

Furthermore, a hydraulic drive wheel mechanism that is pushed into the drum is not optimal. The tire often needs significant external pressure applied to create sufficient friction for driving (that is, rotating) the drum. Hydraulic systems can also bleed-off, causing the drum to not be engaged to the tire drive. Direct gear drives have to be greased as well as replaced to operate, and are often quite heavy. Direct drives have an inherent pinch point creating an unsafe work environment.

In many applications of the cable held on the drum, the cable is connected (or banded) to an apparatus. For example, in some drilling operations, the cable is a power cable, and needs to be connected to a steel cylinder of a drill. To perform this connection in the field, as it is spooled out, the cable is held against the steel cylinder and a metal or plastic band is wrapped around the cylinder and the cable. The wrapped band is then tightened and the ends crimped and cut with a banding machine, to hold the cable to the cylinder.

In these applications, the banding is typically held on a banding cart. Often, the cart is mounted to the spool trailer (or other vehicle). However, the banding and the cart are often relatively heavy, and thus loading and unloading of the banding cart device can be a grueling process. The typical way that the banding cart is loaded onto the truck or trailer is by simply dead lifting the entire cart into the desired position creating the potential for serious injuries to workers. Thus, prior cable drum handling vehicles (and related devices) have numerous shortcomings.

SUMMARY

The present disclosure provides a unitary drum transportation and handling vehicle that overcomes many of the safety and operating problems of prior devices. The present disclosure is explained and depicted in the drawings as a trailer, but could be another type of vehicle (such as a truck) or could be a stationary cable drum handling device. The present disclosure includes a hydraulic driven system with a set of mechanical arms that reach off the rear of the truck or trailer to hoist the cable drum into position. The arms clamp onto the drum, providing a mandrel-less operation.

The present vehicle provides efficient operation without using a mandrel (or shaft) in the drum. The truck or trailer is equipped with rearwardly extending arms that are pivotally mounted on the bed of the truck or trailer and may be supported by stabilizers lowered from the truck or trailer. The arms are capable of extending rearwardly and downwardly beyond the bed. The arms thus pivot up and down, but they also may pivot several inches side-to-side. This means that the arms are able to reach out and "grab" drums of cable that are behind the unit.

Mounts on the end of each arm have a center pin that matches with the center axis of the drum. Each mount has a center pin, and thus when the arms are pivoted downwardly and outwardly, the center pins may be aligned with the center axis of the drum (the hole used to insert the mandrel in prior devices), and the arms may be laterally closed to grasp the drum. The mounts also have engagement pins so that, when the center pin is engaged with the center axis hole, the engagement pins are encompassed between the spokes of the drum to assist in holding the drum in place during operation.

In one embodiment, a hydraulic motor-operated gravity drive that includes a drive wheel tire is mounted on the bed. When a drum is lowered into the operating position, the gravity drive and drive wheel tire rotate the drum to pull cable onto the drum or to release cable from the drum. The gravity drive includes and adjustable mechanism that pushes the tire into solid contact with the drum. The tire is mounted below the center of the drum so that gravity acts to assist in this contact in conjunction with the lift cylinders pulling the drum into position and into the drive tire. This action typically eliminates the need for an additional cylinder or device to actuate the tire into the drum flange. If equipped with springs, a lever arm permits the operator to adjust the location of the springs, and thus to adjust the tension in the springs, to help maintain solid contact of the drive wheel tire to the drum. The gravity drive also includes a variable width locator that laterally moves the drive wheel tire so that different sizes of drums may be accommodated by the same unit. The gravity drive hydraulics system also acts as a brake to the drum with the system turned off or in transportation mode. The end result is that typically a single worker is able to safely transport and to handle cable drums of significant size.

According to some embodiments, a banding cart mounts to the trailer. A bracket affixed on the trailer has mounting elements that hold part of the bottom of the banding cart. The banding cart mounts to the trailer by tilting the banding cart back so that the bottom frame rises above the mounting elements. The bottom frame is set above those elements, and the cart lifted up onto the trailer, using leverage, and latched to the trailer.

Typical devices have a fixed displacement pump, that is, a pump that continually pumps hydraulic oil to maintain pressure. The present device is equipped with a load sensing hydraulic system. In this hydraulic system, oil is pumped when needed. Thus, when nothing is functioning on the apparatus, the hydraulic pump strokes down, which in turn puts a much smaller load on the engine, resulting in less wear and less fuel consumption.

BRIEF DESCRIPTION OF THE DRAWINGS

Other features and advantages of the present invention will be apparent from reference to the following Detailed Description taken in conjunction with the accompanying Drawings, in which.

DETAILED DESCRIPTION

Figure 1:
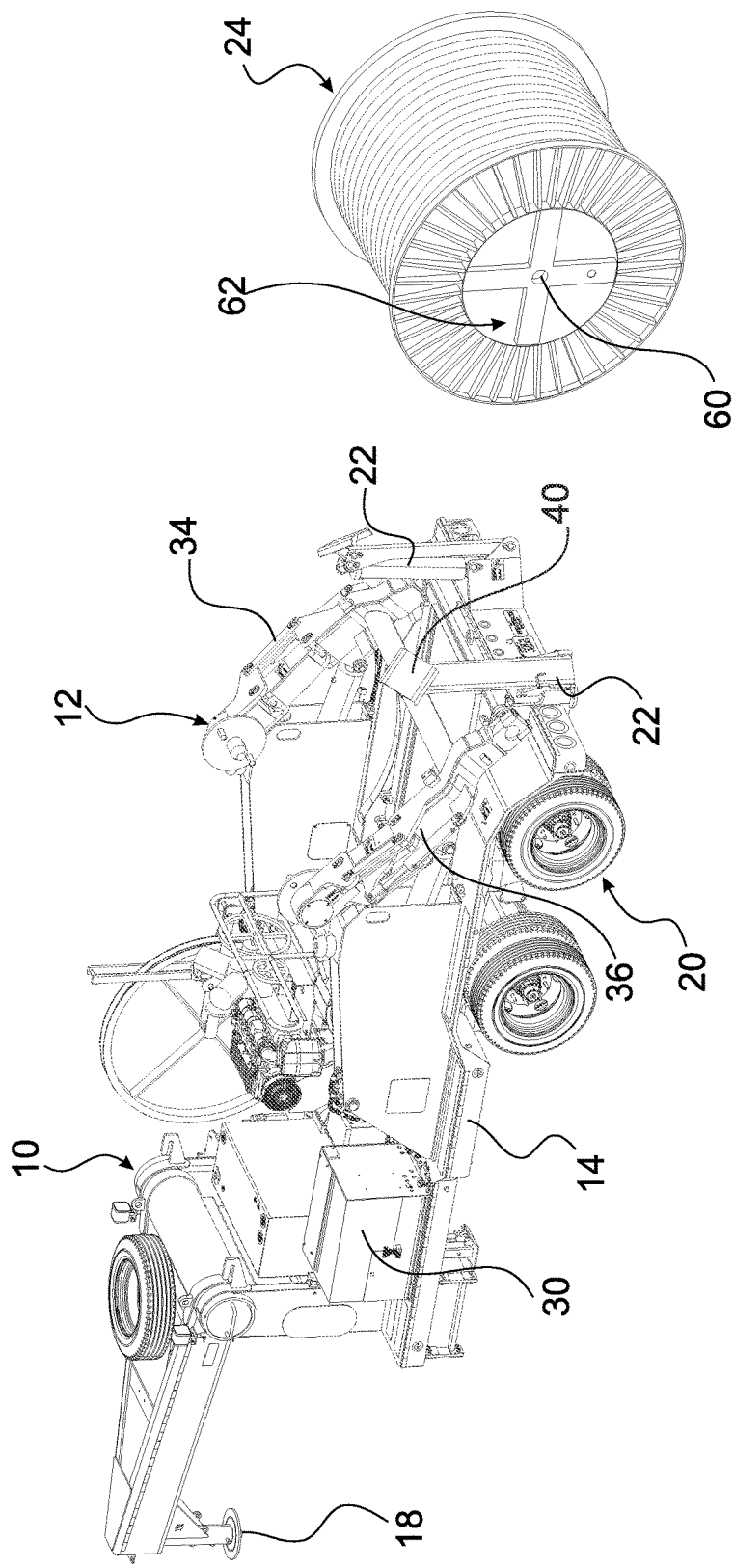
FIG. 1 depicts a perspective view of a drum transport and handling apparatus mounted on a trailer with a cable drum nearby.
Figure 2:
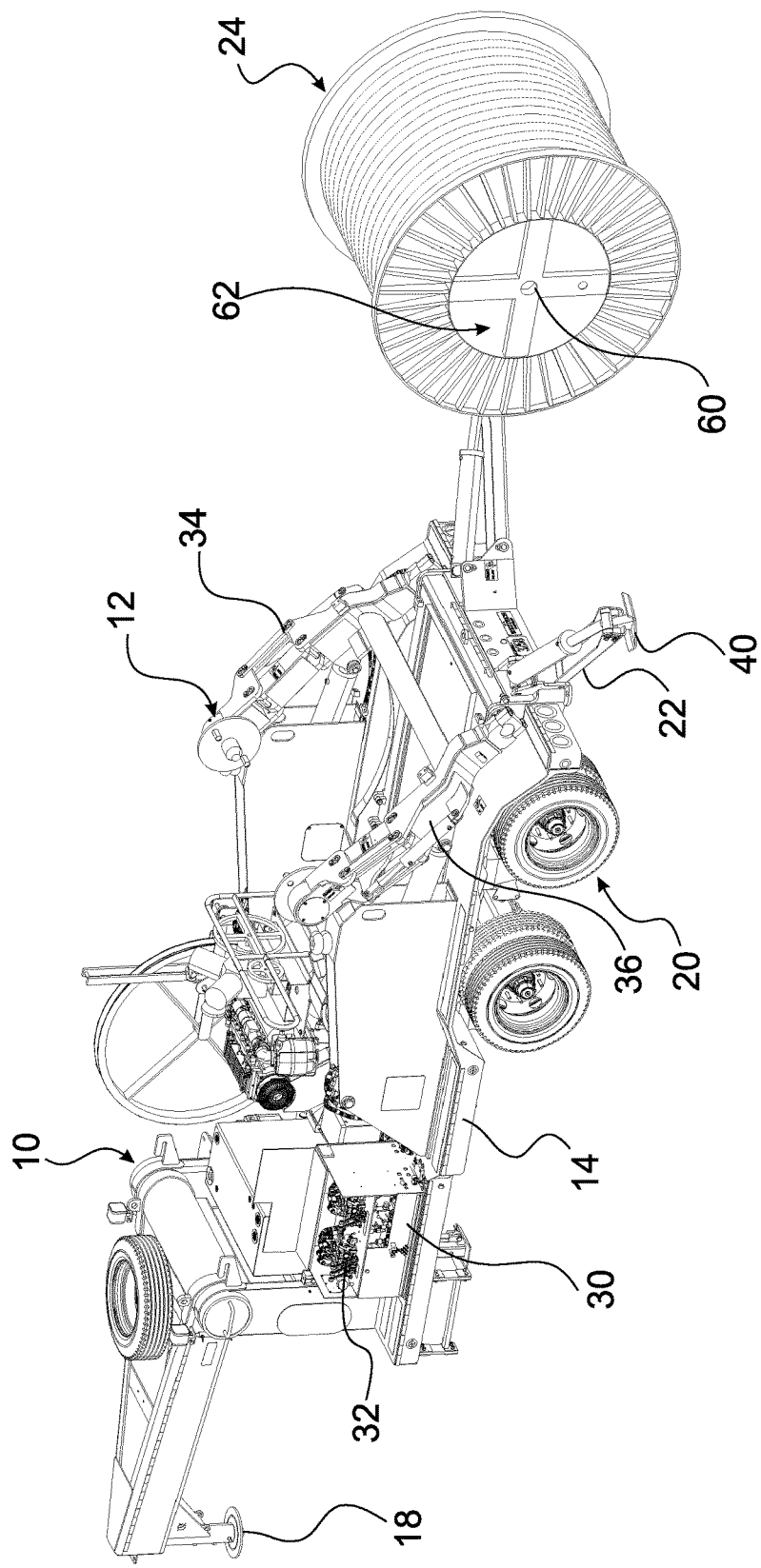
FIG. 2 depicts a perspective view of a drum handling apparatus after the operator has opened the operator's station and lowered the stabilizers far enough to clear the drum but not touch the ground.

FIGS. 1 and 2 depict perspective views of a representative trailer 10 on which is mounted a cable drum mounting apparatus 12. Although depicted as a trailer in the various Figures, the apparatus could also be mounted on the bed (or other supporting structure) of a truck or train car or other vehicle. The specific configuration shown may also be adjusted to take into account vehicle types, drum types, size and weight considerations, and other such customizations.

As depicted in FIGS. 1-7, the trailer 10 has a bed 14 and a trailer hitch 18. Pairs of wheels 20 mounted on opposing sides of the trailer facilitate transporting the trailer, as is typical with trailers. A pair of stabilizers 22 mounted on the rear of the trailer support the trailer when loading, unloading, or rotating a drum 24. A pair of vertically mountable lights 28 affixed to the hitch provide light when the trailer is in operation (see FIG. 6).

Figure 3:
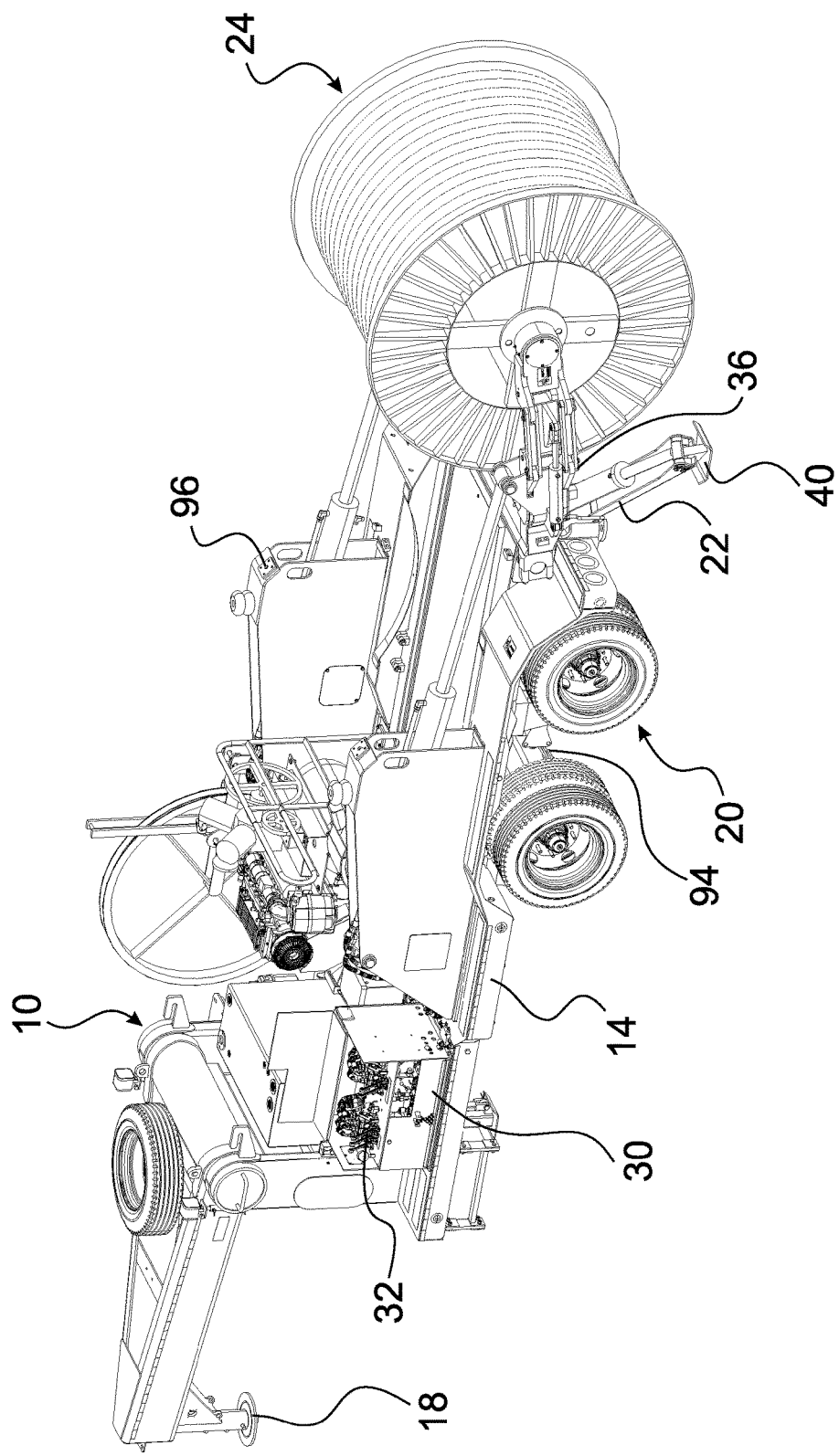
FIG. 3 depicts a perspective view of a drum handling apparatus after the lift arms have engaged with the drum and the operator has lowered the stabilizers.
Figure 4:
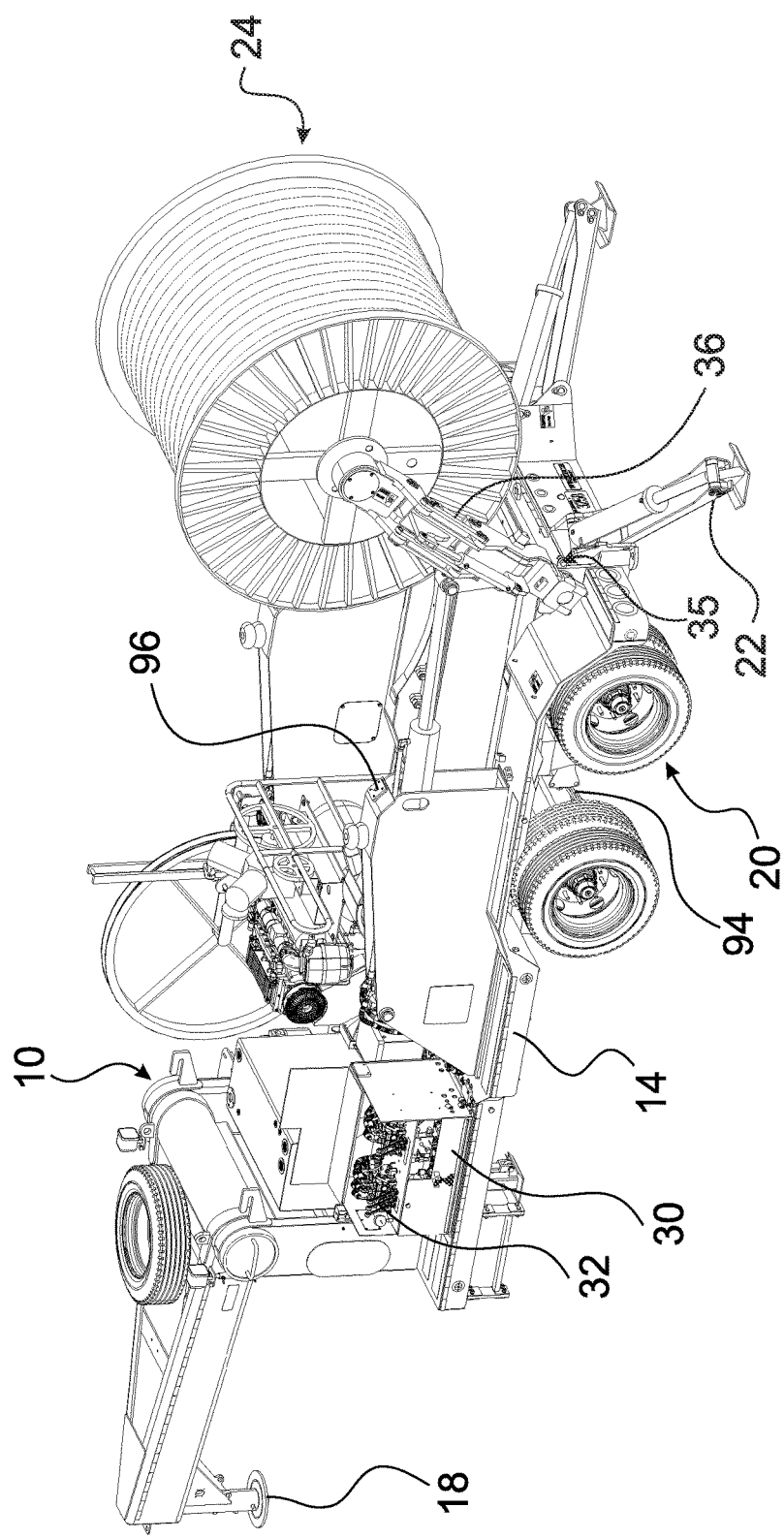
FIG. 4 depicts a perspective view of a drum handling apparatus as the drum is being hoisted onto the bed of the drum handling apparatus.

An operator working at an operator station 30 runs a hydraulic control system 32 mounted near the front of the trailer 10. Two hydraulically driven opposing lift arms 34 and 36 mounted near the rear of the trailer 10 operate to lift the drum up off the ground and onto the trailer, see FIGS. 3-5. The lift arms also lift the drum off the trailer and put it back on the ground. The hydraulic control system 32 may incorporate a safety lock out device to prevent dropping a drum and damaging the support structure or drum once the drum is raised past a pre-determined point. That is, as depicted in FIG. 4, a sensor 35 (such as an electronic eye or a switch) is connected to the control system 32. When the sensor 35 detects that the drum has been lifted above the ground a certain distance, typically about a foot, the control system 32 locks the flow in the hydraulic lines for the clamping movement, meaning the lift arms 34 and 36 are disabled from further clamping movement (towards or away from the drum). Thus, the lift arms cannot release the drum 24. This prevents the drum from being released and, for example, rolling across the ground and potentially causing damage to the drum, to the cable, to the trailer, or to the surrounding area or people in the surrounding area.

FIGS. 1-7 demonstrate the basic operation of the trailer 10. As depicted in FIG. 1, the trailer is first backed up towards the drum 24, and in general alignment with the drum. That is, the drum is transversely mounted on the trailer (mounted with the central axis of the drum perpendicular to the direction of trailer travel), and the trailer is aligned so that the axis of the cylindrical drum is generally parallel to the rear of the trailer (and perpendicular to the direction of the trailer movement). In other embodiments, the arms are mounted and configured to come off the side of the trailer or truck and load or unload the drum from the side.

As depicted in FIG. 2, when the trailer 10 is in position, the operator opens the operator station 30 and lowers the stabilizers 22 so that the feet 40 of those stabilizers are a few inches above the ground. As depicted in FIG. 3, the lift arms 34 and 36 are then pivoted down and extended out beyond the end of the trailer. The lift arms also pivot in a transverse direction, so that they can open wide enough to go around the edges of the drum 24 and thereafter pivot inwardly and grasp the drum, as more particularly described below. The operator also lowers the stabilizers 22 to strike and engage the ground. When the stabilizers are lowered, the effective base of the trailer is widened, thus offering a larger footprint, thereby stabilizing the load on the suspension 94 (see FIGS. 3 and 4), providing a more equally distributed load across the trailer, and providing support to the trailer 10.

Figure 5:
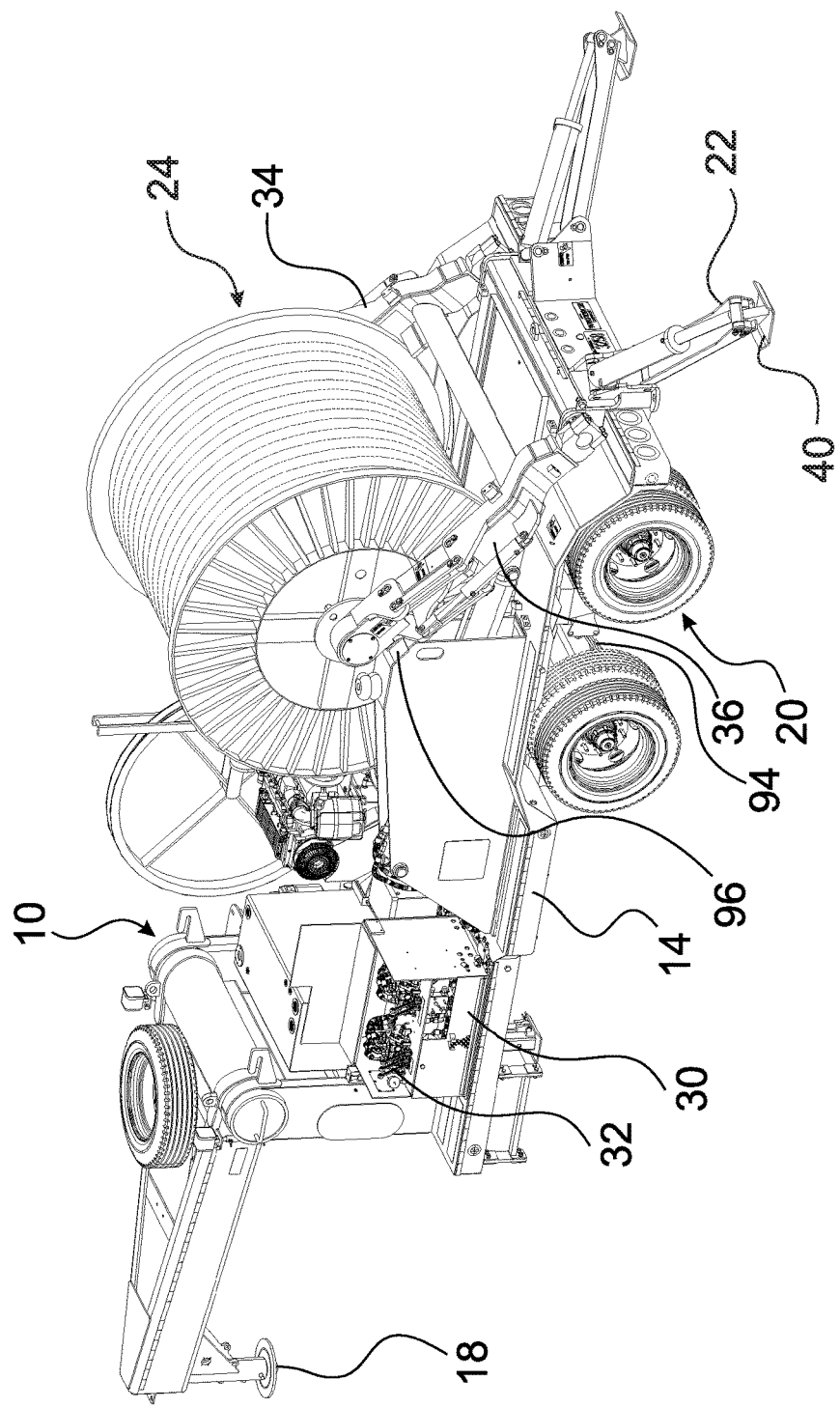
FIG. 5 depicts a perspective view of a drum handling apparatus after the drum has been positioned on the bed.
Figure 6:
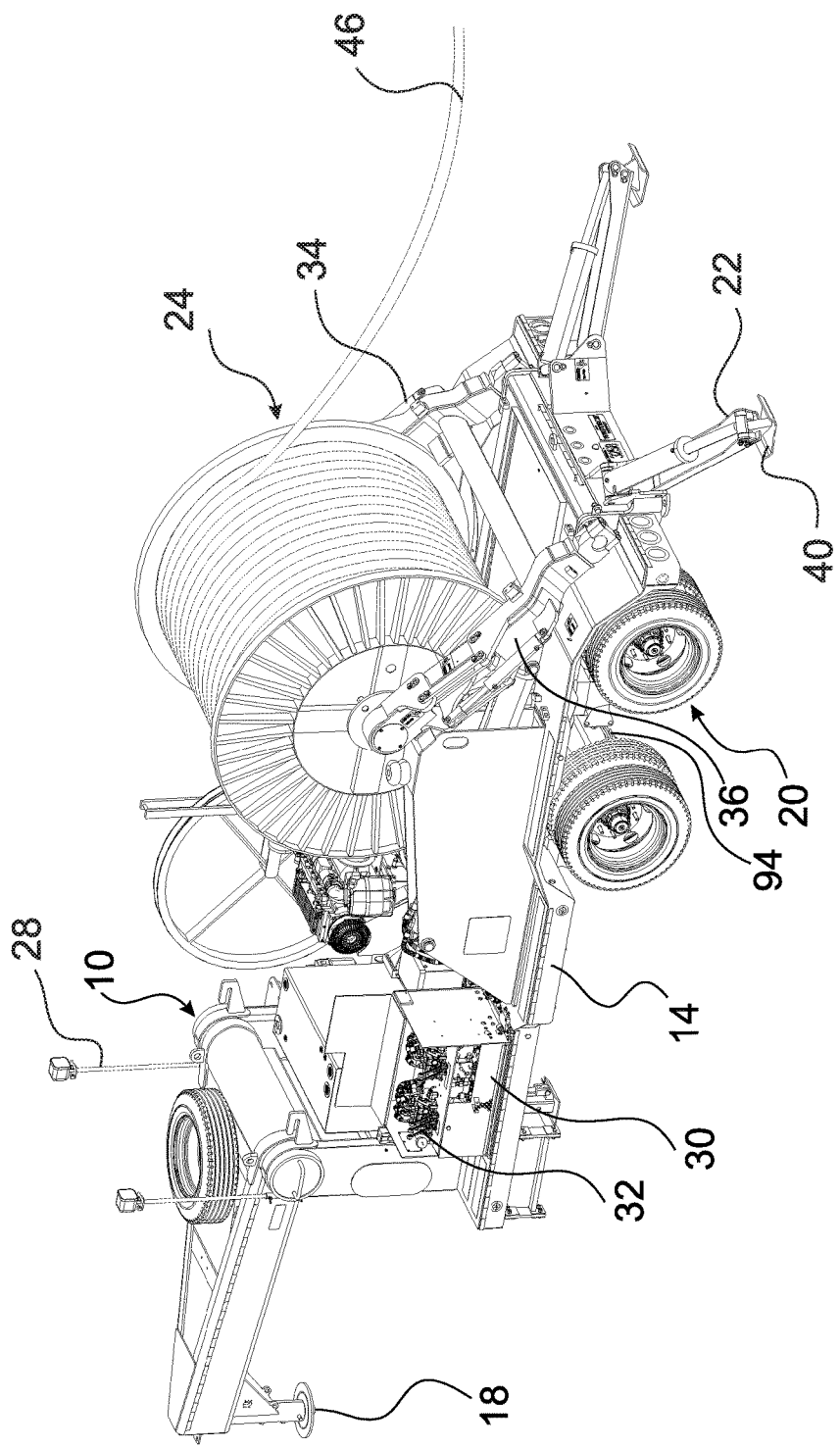
FIG. 6 depicts a perspective view of a drum handling apparatus as the cable is spooled out or wound onto the drum.
Figure 7:
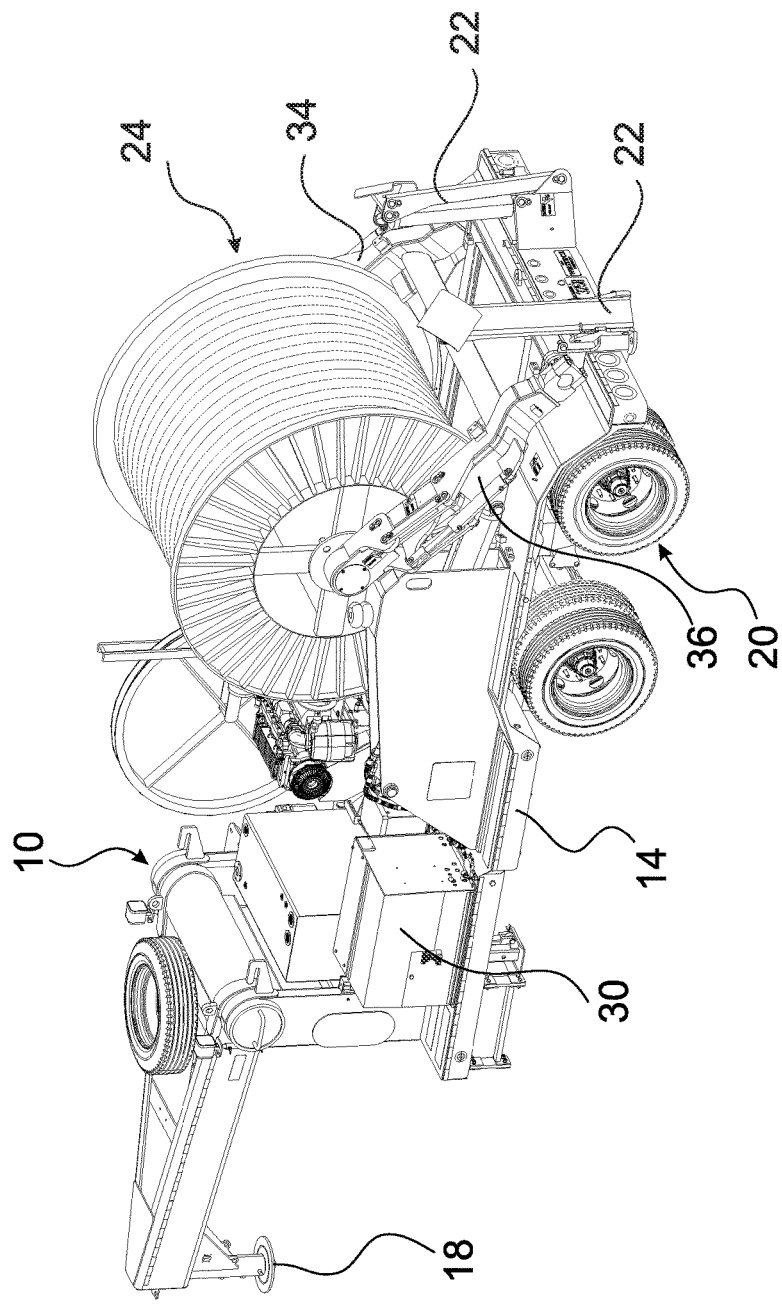
FIG. 7 depicts a perspective view of a drum handling apparatus in a transport condition.

As depicted in FIG. 4, after grasping the drum 24, the lift arms 34 and 36 are pivoted upward to raise the drum up above the level of the bed 14. As depicted in FIG. 5, the lift arms rotate around until they rest against stops 96, placing the drum 24 onto the bed 14 of the trailer 10. As depicted in FIG. 6, the drum 24 is then in an operating position, in which the drum may be rotated to spool out cable 46 as well as take in cable. As depicted in FIG. 7, after use, the stabilizers 22 are raised, the operator station 30 is closed, and the trailer is then in a transport position, where the trailer may be towed to another location, stored, or otherwise left for future use. Alternatively, the steps depicted in FIGS. 3-5 may be reversed, to place the drum 24 back onto the ground for storage, or to replace the drum with another spool or drum.

Figure 8:
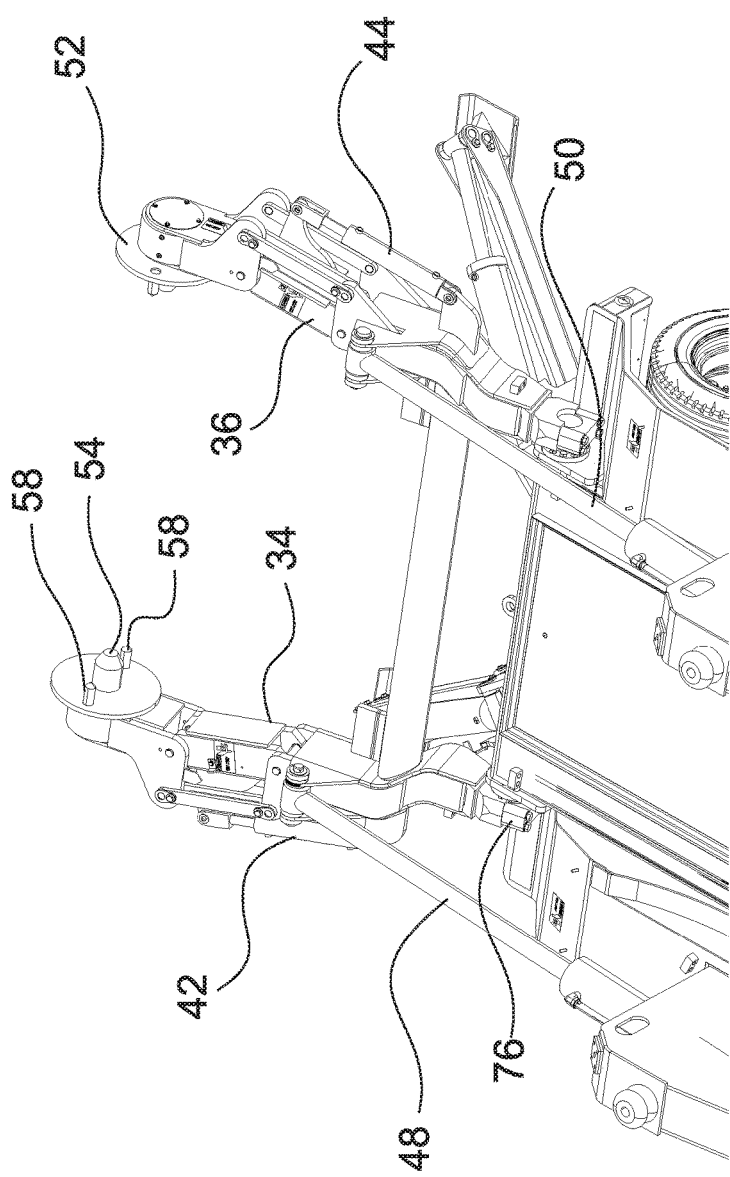
FIG. 8 depicts a partial perspective view of the rear of the drum handling apparatus with the arms in the wide position with the stabilizers lowered.
Figure 9:
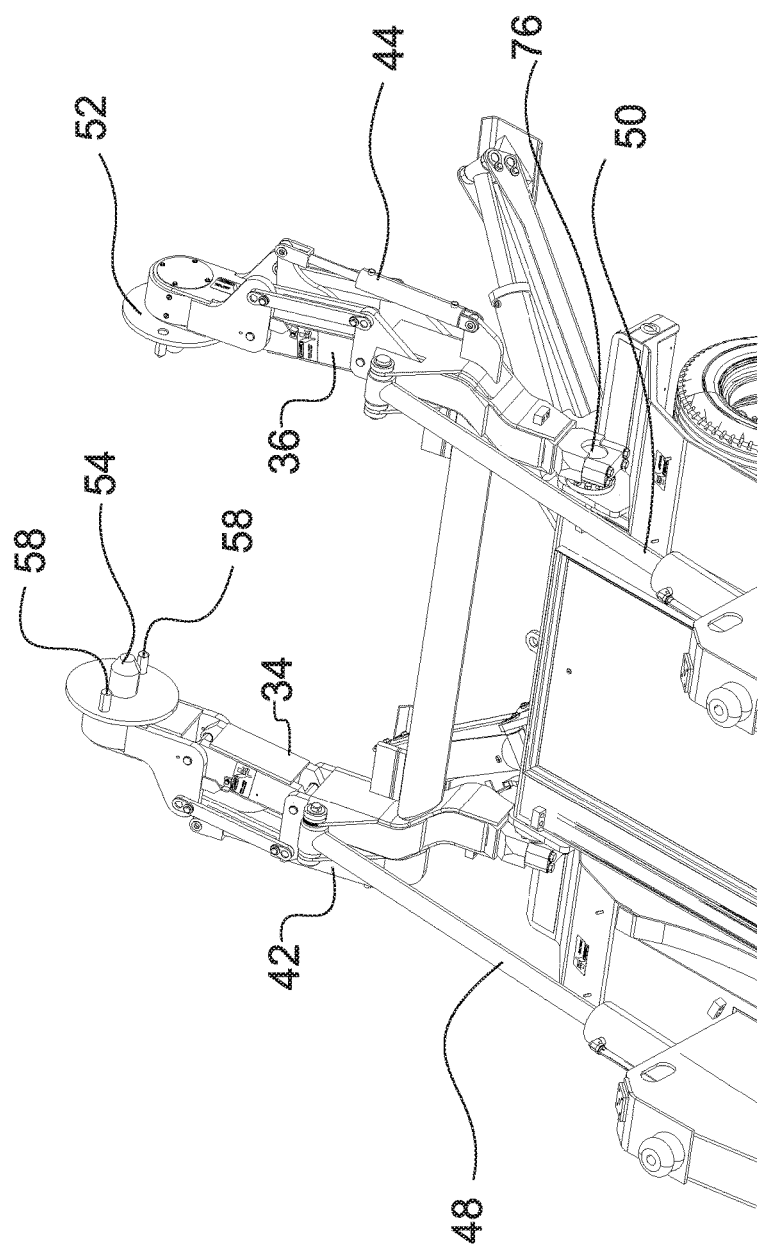
FIG. 9 depicts a partial perspective view of the rear of the drum handling apparatus with the arms in the narrow position with the stabilizers lowered.

FIGS. 8 and 9 depict close-up views of the lift arms 34 and 36. The view in FIG. 8 is of the lift arms 34 and 36 transversely extended to pass over a drum 24, and the view in FIG. 9 is of the lift arms extended towards each other to grasp the drum. The lift arms include hydraulic clamp cylinders 42 and 44 to pivot the lift arms around a pivot point. Hydraulic lift cylinders 48 and 50 enable the lift arms to extend well beyond the back of the trailer 10 to grasp a drum 24. In the embodiment depicted in FIGS. 8 and 9, ball and socket connections 76 are used to enable the pivoting motion of the lift arms 34 and 36, but other connection designs (such as a pin and bore arrangement) could also be used.

The ends of the lift arms 34 and 36 each have a grasping pad 52 with a center drum alignment pin 54 in the center of the pad 52 and two engagement pins 58 attached toin the pad on opposite sides of the alignment pin. In operation, the alignment pin 54 is inserted (when the lift arms are pinched towards each other) into the center drum holes 60 on each side of the drum 24 (shown in FIGS. 1 and 2). When a drum is grasped, the engagement pins line up with two of the four openings 62 in the side of the drum. Thus, the grasping pads 52 can grab the drum and the lift arms lift the drum onto the trailer. The grasping pads remain parallel to each other, and may be pivoted inwardly so as to accommodate different sizes of drums.

Figure 10:
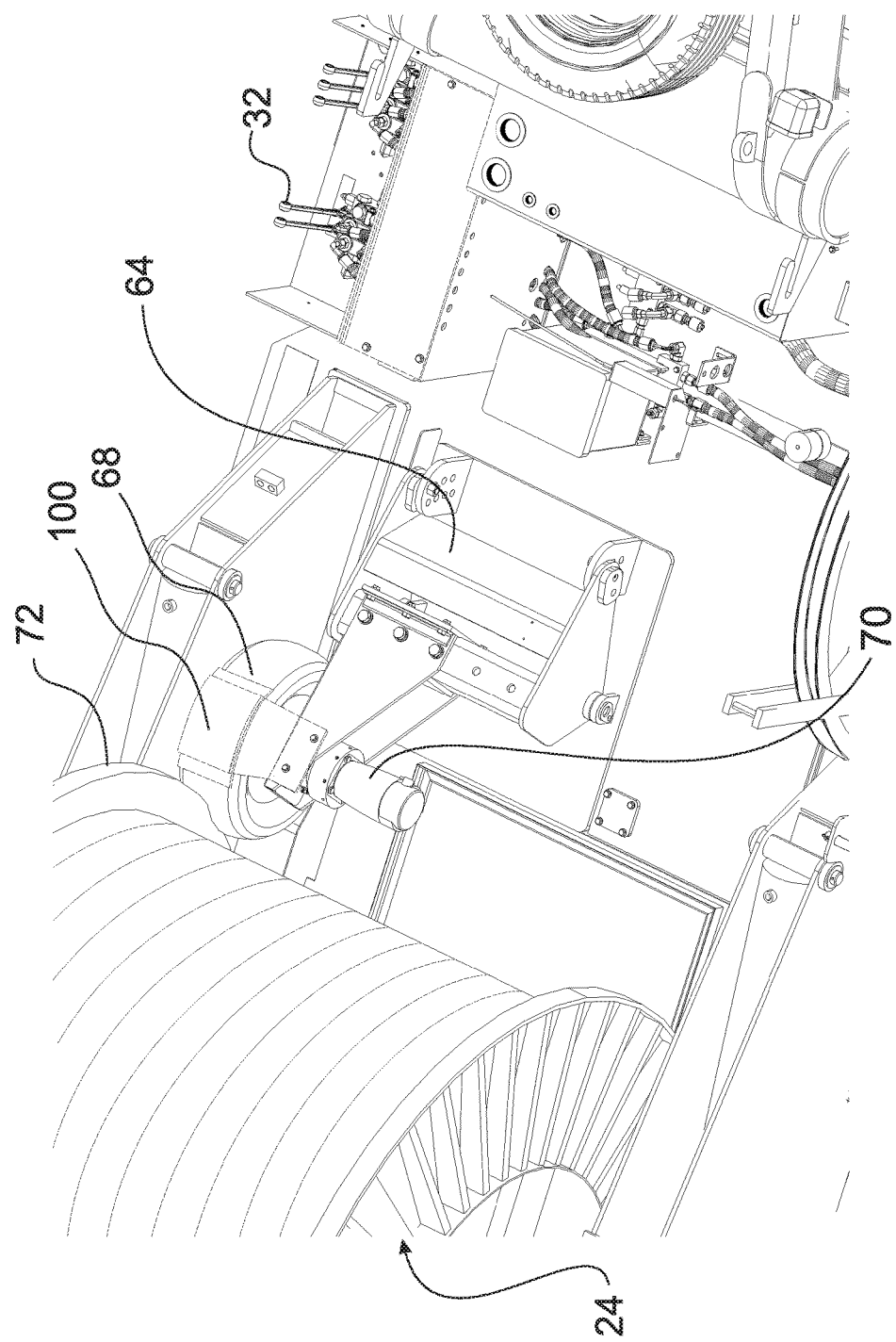
FIG. 10 depicts a partial perspective view of the gravity friction drive with the cover affixed and with a large diameter drum engaged on the drum handling apparatus.
Figure 11:
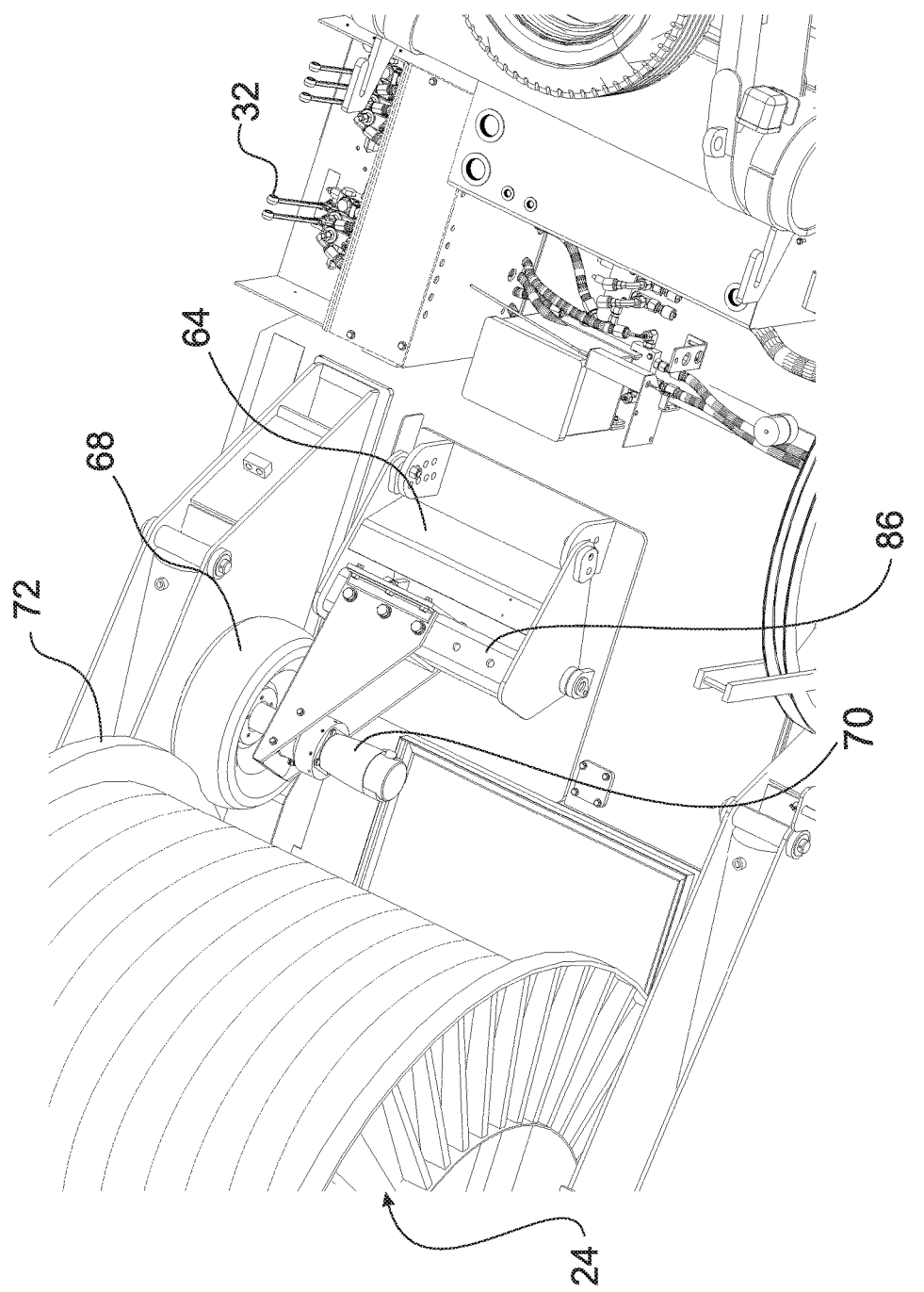
FIG. 11 depicts a partial perspective view of the gravity friction drive with the cover removed and with a large diameter drum resting on the drum handling apparatus.
Figure 12:
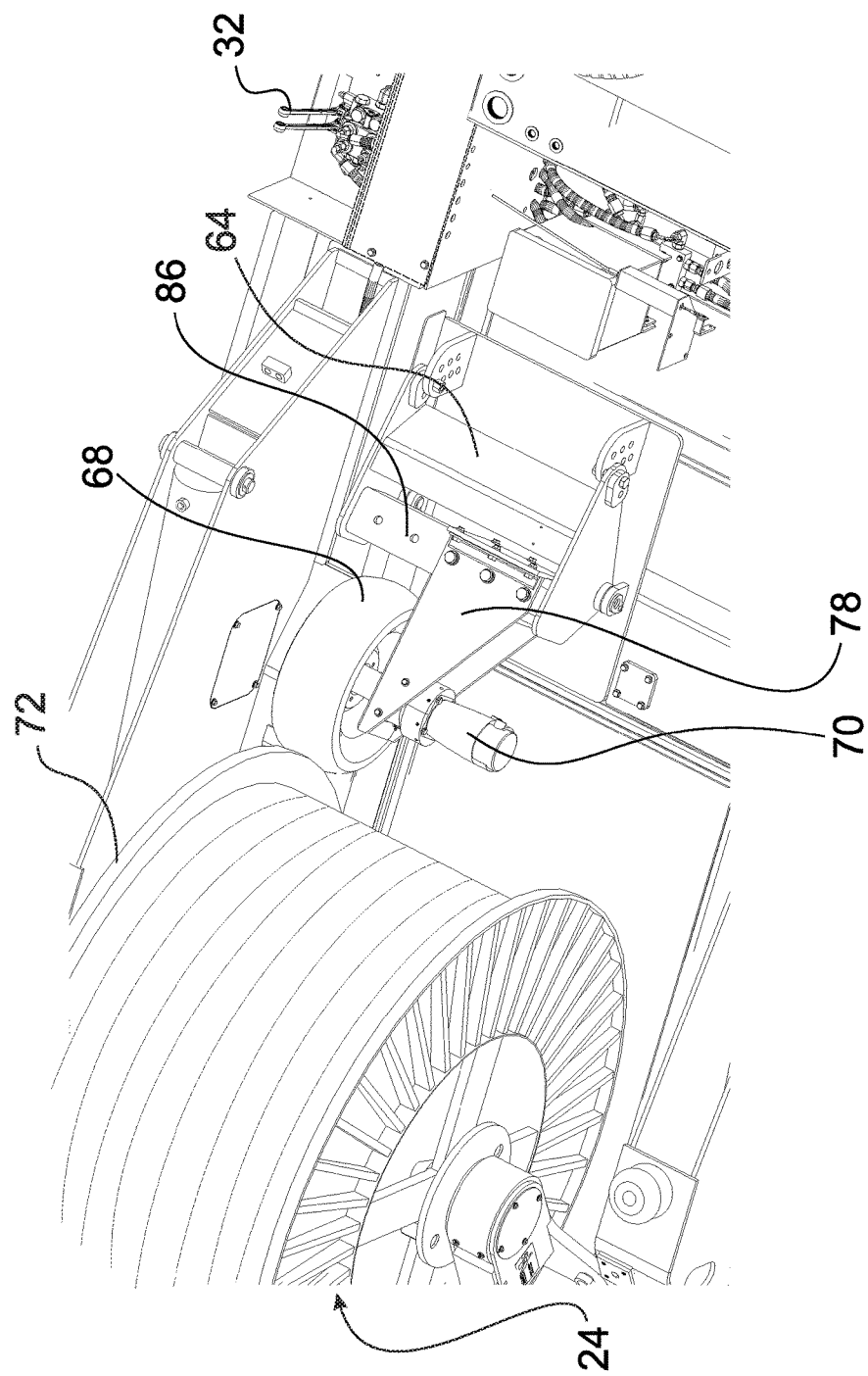
FIG. 12 depicts a partial perspective view of the gravity friction drive with the cover removed and with a small diameter drum resting on the drum handling apparatus.

The trailer 10 is also equipped with a gravity drive 64 having a drive wheel tire 68 and a hydraulic motor drive 70. The grasping pads generally freely rotate, as the rotation of the drum 24 is accomplished using the gravity drive. When a drum 24 is engaged, gravity and the lift cylinders 48 and 50 cause one rim 72 of the drum to come into contact with, and push against, the drive wheel tire. The combined effect of gravity, the lift cylinders 48 and 50, and an adjustable mechanism (such as springs 74) is to ensure that the drive wheel tire 68 is in firm contact with the rim 72 of the drum. FIGS. 10 and 11 depict this for a larger spool or drum, and FIG. 12 depicts this for a smaller spool or drum. FIGS. 11 and 12 also depict the gravity drive with the cover plate 100 removed. Because the width of drums can change, the gravity drive includes a variable width locator 78 that laterally moves the drive wheel tire so that different sizes of drums may be accommodated on the same bed 14, as can be seen by comparing the location of the width locator 78 as depicted in FIGS. 11 and 12.

As depicted in FIGS. 10-12, a hydraulic drive motor 70 is mounted on the gravity drive 64 opposite the drive wheel tire 68. The hydraulic drive motor 70 rotates the drive wheel tire in either rotational direction. As the drive wheel tire rotates, it drives rotation of the drum, thereby spooling out cable 46 or spooling in cable, depending on the direction of rotation. The hydraulic system is designed so that the tire acts as a brake until the hydraulic motor is activated to spool the drum either way. Furthermore, comparing FIGS. 11 and 12, the drive wheel tire may be laterally moved along a mounting bracket 86 so as to accommodate various sizes of drums.

Figure 13:
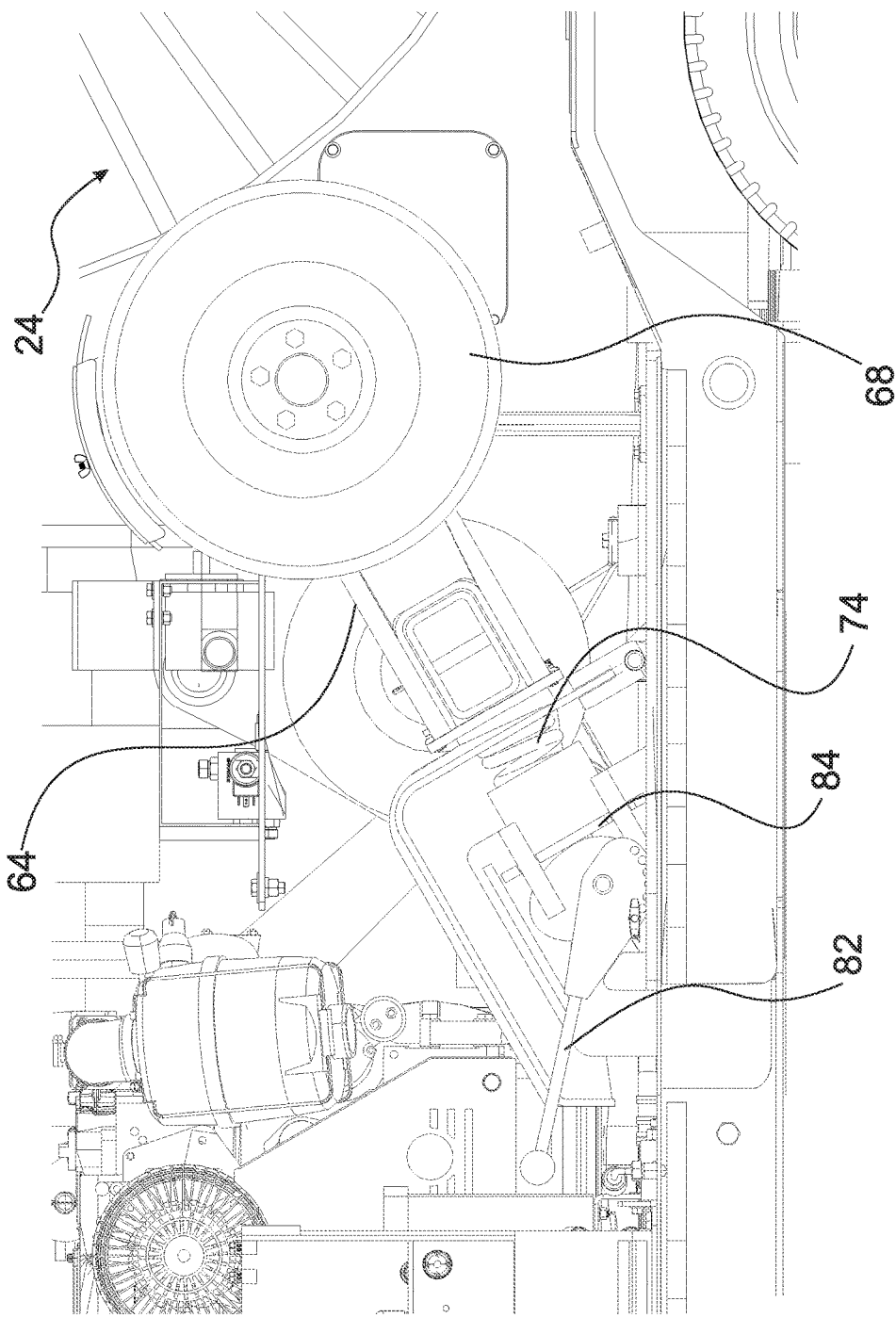
FIGS. 13A and 13B depict side sectional views of the gravity drive and lever arm for adjusting the tension for engagement of the drive tire to the drum.
Figure 13:
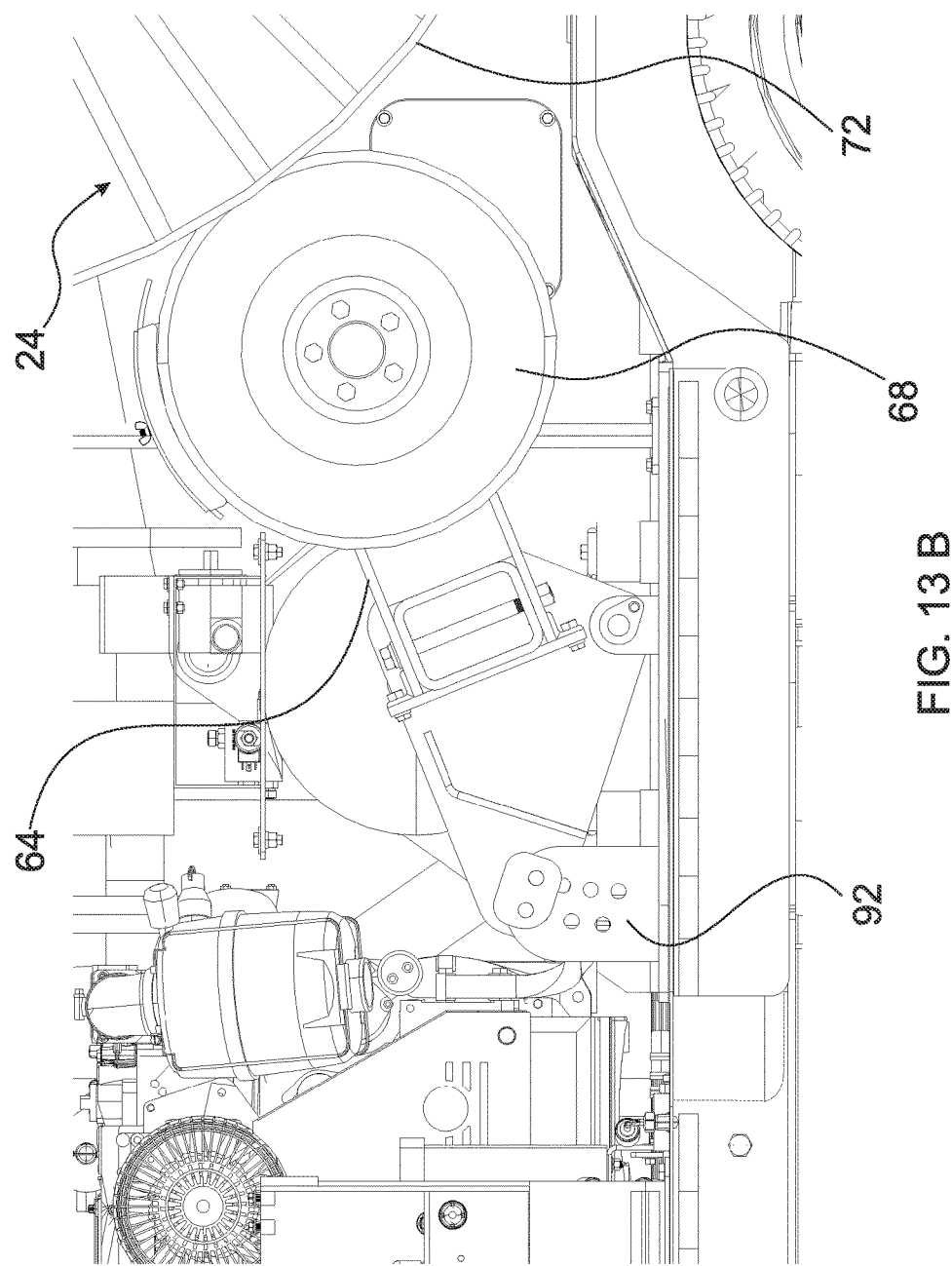
Figure 14:
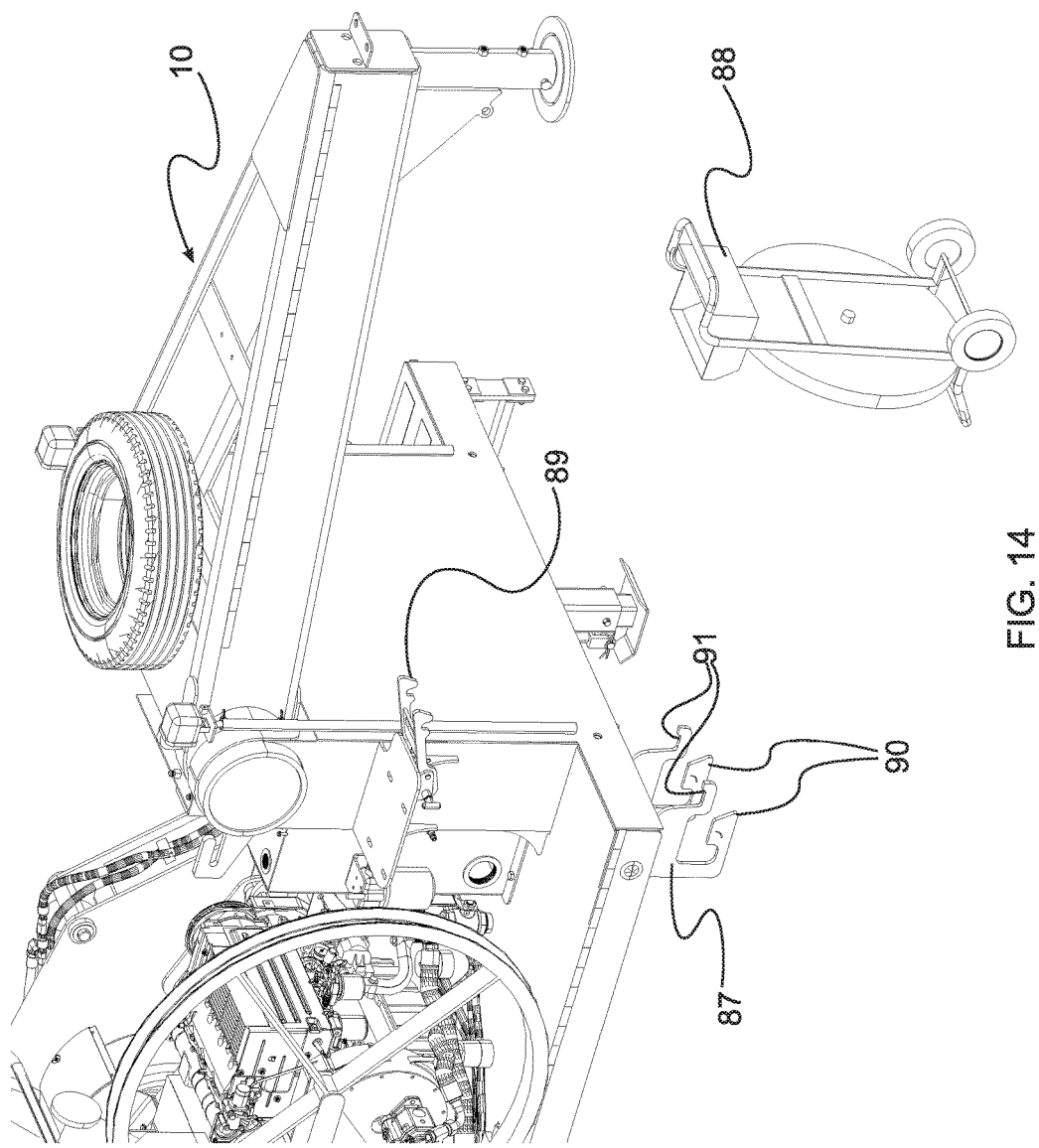
FIG. 14 depicts a first perspective view of an apparatus and method for mounting a banding cart to the drum handling apparatus.
Figure 15:
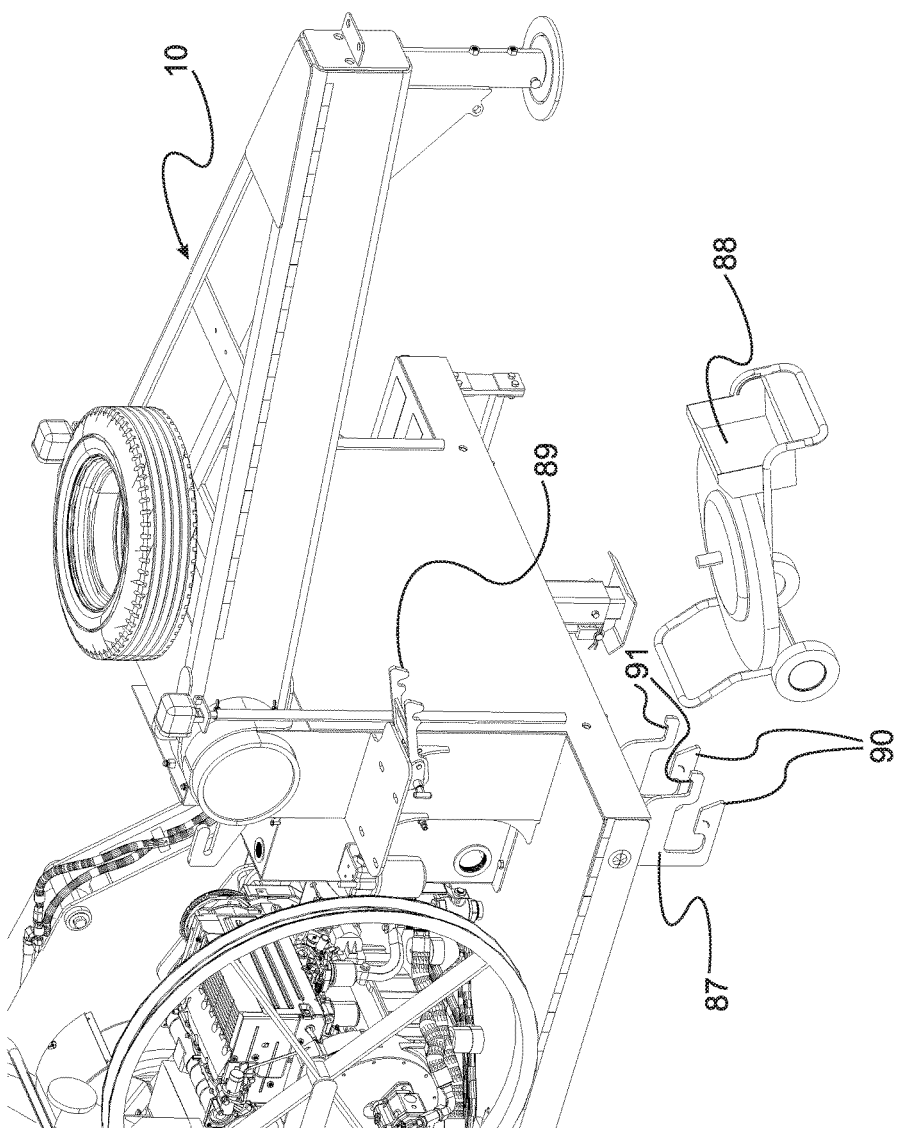
FIG. 15 depicts a second perspective view of an apparatus and method for mounting a banding cart to the drum handling apparatus.

As depicted in FIG. 13A, a lever arm 82 mounted at the base of the gravity drive 64 may be used by the operator to adjust the tension in the springs 74. To increase the tension, the operator pushes the lever arm upwards, thereby shifting the base 84 on which the springs rest upward towards the drive wheel tire 68. Conversely, the tension is reduced by lowering the lever arm. As depicted in FIG. 13B, in other embodiments, the springs 74, lever arm 82 and base 84 are not included, and an adjustable base 92 is added to manually adjust the tension between the tire drive and the rim of the drum 72.

As mentioned above, in many applications of the cable held on the drum, the cable is connected to a steel cylinder by metal or plastic bands. For example, in some drilling operations, the cable is a power cable, and needs to be connected to the steel cylinder of the drill. To perform this connection in the field, as the cable 46 is spooled out, the cable is held against the steel cylinder and a metal or plastic band is wrapped around the cylinder and the cable. The wrapped band is then tightened, the ends crimped, and then cut, thereby connecting the cable to the cylinder.

In these applications, the banding is typically held on a banding cart 88. Steel or metal bands are wrapped on the spool of the banding cart for ready access in the field. It is often useful to have the banding cart 88 mounted directly on the spool trailer 10 (or other vehicle). However, the banding and the cart are often relatively heavy, and thus it may be difficult to mount the banding cart to the trailer without a risk of injury to workers.

Figure 16:
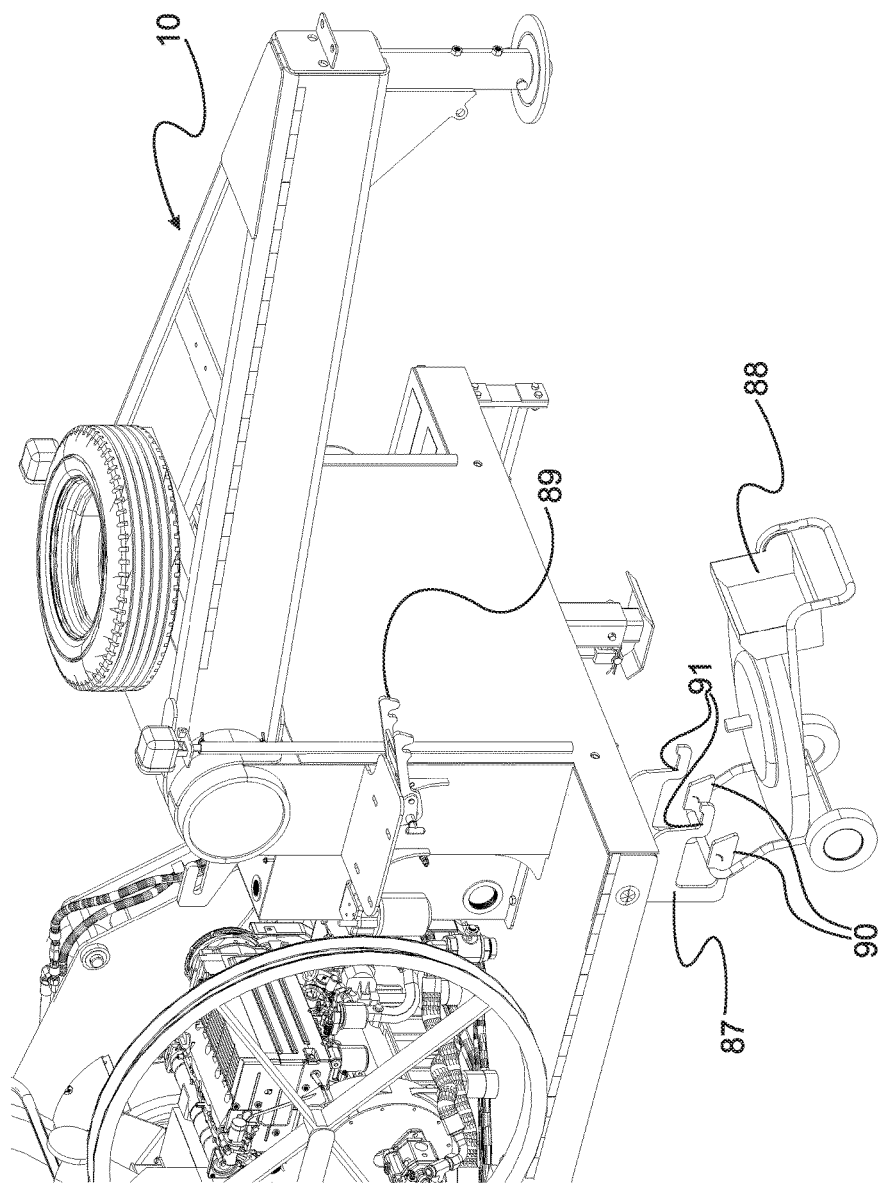
FIG. 16 depicts a third perspective view of an apparatus and method for mounting a banding cart to the drum handling apparatus.
Figure 17:
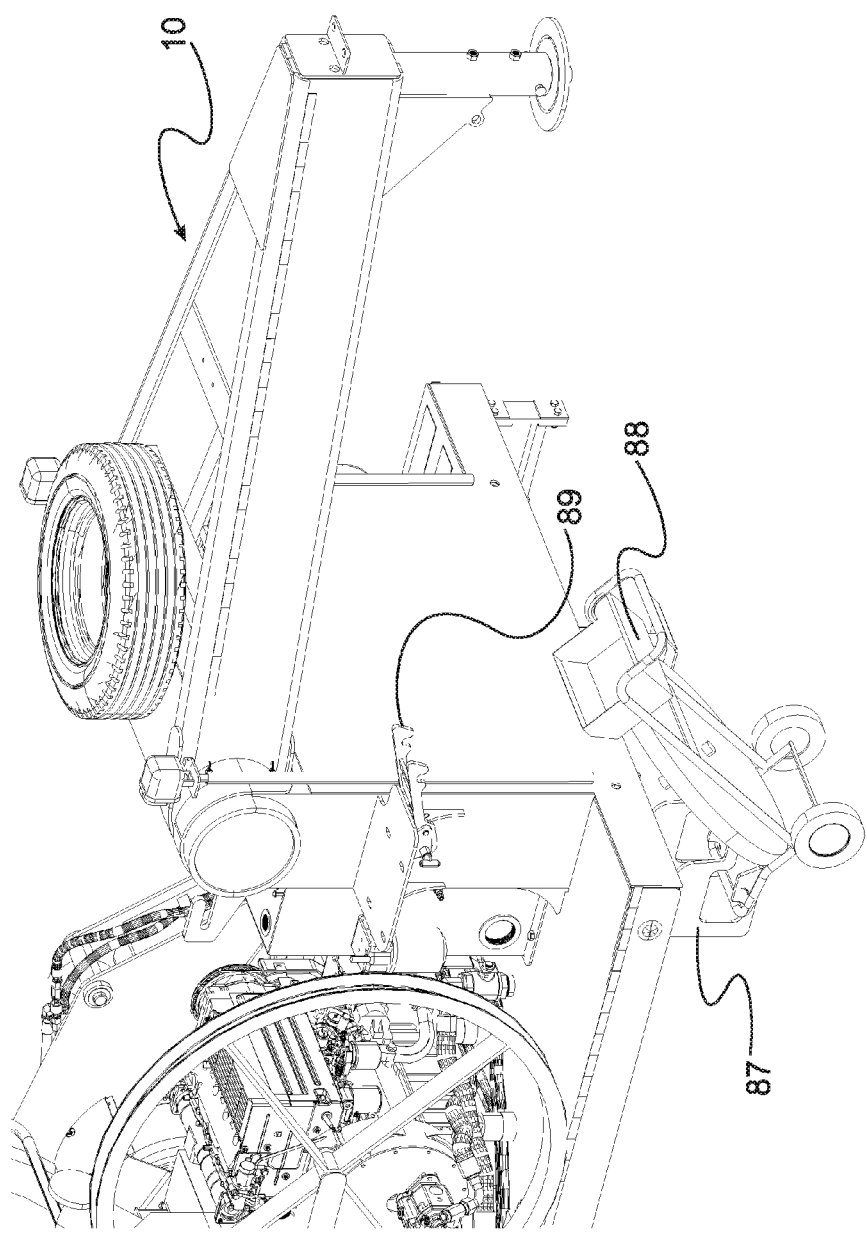
FIG. 17 depicts a fourth perspective view of an apparatus and method for mounting a banding cart to the drum handling apparatus.
Figure 18:
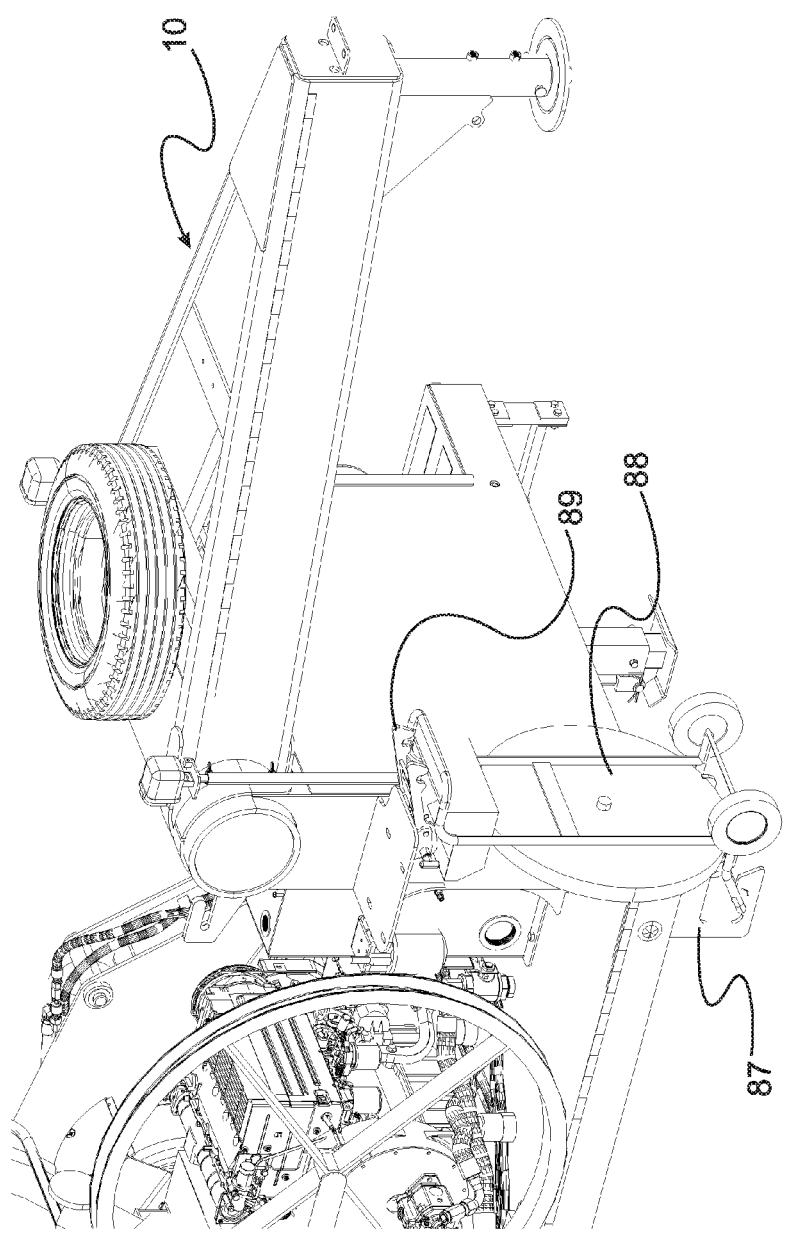
FIG. 18 depicts a fifth perspective view of an apparatus and method for mounting a banding cart to the drum handling apparatus.
Figure 19:
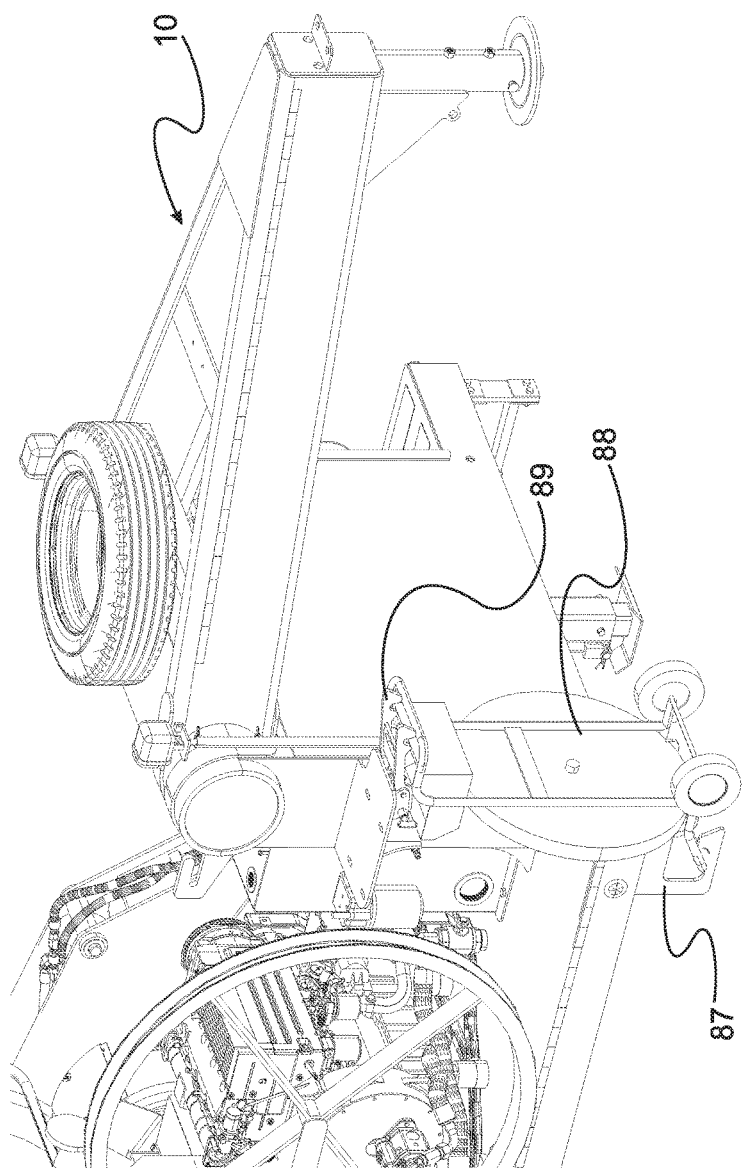
FIG. 19 depicts a sixth perspective view of an apparatus and method for mounting a banding cart to the drum handling apparatus.
Figure 20:
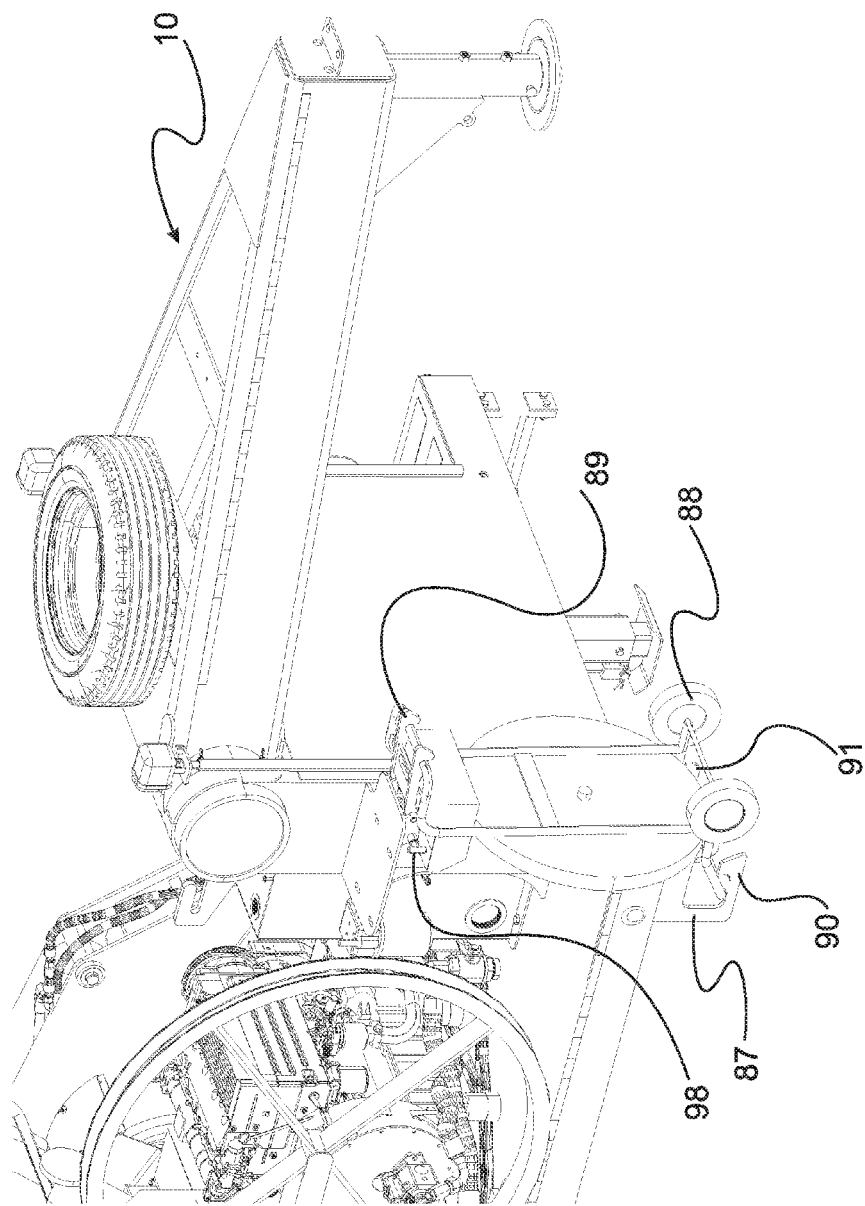
FIG. 20 depicts a seventh perspective view of an apparatus and method for mounting a banding cart to the drum handling apparatus.

As depicted in FIGS. 14-20, according to one embodiment the banding cart 88 mounts directly to the trailer 10. A tilting bracket 87 affixed on the trailer has tilting bracket mounting fins 90 and 91 that extend down below the bed 14. The banding cart 88 is tilted back and pushed forward until the lower portion of the banding cart 88 is resting on the tilting bracket mounting fins 90 as shown in FIG. 16. The banding cart is then pivoted upward as shown in FIG. 17, allowing the upper tilting bracket mounting fins 91 to engage with and support the cylinder of banding material. Once the banding cart 88 is pivoted into place, a latch handle 89 is lowered into position to lock the banding cart 88 into place as shown in FIGS. 18-20. The latch handles 89 are held in the locked position with a pin 98. This operation greatly reduces the weight that any operator should encounter when loading and unloading the banding cart. To unload the banding cart 88, an operator reverses these steps.

The trailer 10 may also include various other items, such as backup cameras, multiple wheels or other items as known in the art. Furthermore, rather than mount the present apparatus on a trailer, the apparatus may be mounted on a truck bed or rail car or other such transportation devices. Although the embodiments discussed in this disclosure involve a specific design for a cable drum trailer, a trailer having other similar designs would also work, and the apparatus could be used for various other payloads, including wire, tubing, belting, and other items that are rolled onto a drum. The present designs may also be useful for vehicles used for transporting and using spools or drums in other applications. Thus, the present invention has several advantages over the prior art. Although embodiments of the present invention have been described, various modifications and changes may be made by those skilled in the art without departing from the spirit and scope of the invention.

The invention claimed is:

1. A cable drum handling apparatus comprising:
   first and second hydraulically driven opposing lift arms mountable to a support structure, the support structure having a length and a width, each lift arm having a proximal end and a distal end and having a medial side and a lateral side, and oriented so that the medial side of the first lift arm opposes the medial side of the second lift arm, the lift arms being extendible in a distal direction beyond the length of the support structure, the lift arms being pivotable in a lateral direction outside the width of the support structure;
   a first grasping pad on the medial side of the distal end of the first lift arm and a second grasping pad on the medial side of the distal end of the second lift arm, the first and second grasping pads thereby being opposed, the first grasping pad comprising a first center drum alignment pin and two engagement pins attached to the first grasping pad on the medial side of the first lift arm, the second grasping pad comprising a second center drum alignment pin and two engagement pins attached to the second grasping pad on the medial side of the second lift arm, the first center drum alignment pin being insertable into a center axis of a cable drum on a first side and the second center drum alignment pin being insertable into the center axis of the cable drum on a second side, the two engagement pins on the first grasping pad being insertable between spokes on the first side of the cable drum and the two engagement pins on second grasping pad being insertable between spokes on the second side of the cable drum;
   a hydraulic control system mountable to the support structure, the hydraulic control system configured to operate to extend and to pivot the lift arms, the hydraulic control system thereby enabling the lift arms to extend beyond the length of the support structure and pivot outside the width of the support structure to cause the center alignment pins to insert into the center axis of a cable drum and the engagement pins to insert between the spokes of the cable drum, the hydraulic control system further acting to cause the lift arms to pivot transversely and thereby grasp the cable drum, the alignment pins and engagement pins thereby working together to assist in holding in place opposing sides of the cable drum at the distal end of the lift arms, the lift arms and the hydraulic control system further configured to cause that the first and second grasping pads remain parallel with respect to each other when the lift arms are being pivoted with respect to each other; and
   the hydraulic control system further configured to cause the lift arms to lift and retract the cable drum thereby enabling the handling apparatus to place the cable drum on the support structure as well as to remove the cable drum from the support structure by reversing the steps.

2. The apparatus of claim 1 further comprising an operator station with controls for directing the grasping, lifting and lowering of a cable drum, deployment of stabilizers, operation of engine controls, operation of compressors, control of lighting, and engagement and operation of a drum drive.

3. The apparatus of claim 1 further comprising a gravity drive having a drive wheel tire for turning the cable drum to spool cable in or out when the cable drum is placed in an operating position on the support structure.

4. The apparatus of claim 3 further comprising an adjustable mechanism that exerts more or less tension on the gravity drive to cause the gravity drive to engage with the cable drum by moving the gravity drive up and down.

5. The apparatus of claim 4 further comprising a variable width locator for laterally moving the drive wheel tire so that different sizes of cable drums may be accommodated on the support structure.

6. The apparatus of claim 1 further comprising stabilizers mountable to the support structure to stabilize the support structure.

7. The apparatus of claim 1 further comprising a vertically mountable light affixed to the support structure when the cable drum handling apparatus is in use.

8. The apparatus of claim 1 further comprising a latch and lower bracket for mounting a banding cart to hold banding for the cabling on the cable drum handling apparatus.

9. The apparatus of claim 1 further comprising a safety lock out device for locking the transverse movement of the lift arms once the drum has been lifted a predetermined distance.

10. A cable drum handler comprising:
    first and second opposing lift arms, each lift arm having a proximal end and a distal end and having a medial side and a lateral side, and oriented so that the medial side of the first lift arm opposes the medial side of the second lift arm, the lift arms being extendible in a distal direction and pivotable in a lateral direction; and
    a first grasping pad on the medial side of the distal end of the first lift arm and a second grasping pad on the medial side of the distal end of the second lift arm, the first and second grasping pads thereby being opposed, the grasping pads configured to grasp, lift, and re-locate a cable drum while opposing faces on the grasping pads remain substantially parallel to each other when the lift arms are being pivoted with respect to each other.

11. The apparatus of claim 10 further comprising a hydraulic control system mountable to a support structure having a length and a width, the hydraulic control system configured to operate to extend and to pivot the lift arms, the hydraulic control system thereby enabling the lift arms to extend beyond the length of the support structure and pivot outside the width of the support structure and thereby grasp the cable drum while keeping the grasping pads substantially parallel to each other; and
    the hydraulic control system further configured to cause the lift arms to lift and retract the cable drum thereby enabling the handling apparatus to relocate the cable drum from a first position to a second position as well as to return the cable drum from the first position to the second position by reversing the steps.

12. The apparatus of claim 10 further comprising a first center drum alignment pin attached to the first grasping pad on the medial side of the first lift arm, and a second center drum alignment pin attached to the second grasping pad on the medial side of the second lift arm, the first center drum alignment pin being insertable into a center axis of a cable drum on a first side and the second center drum alignment pin being insertable into the center axis of the cable drum on a second side, the alignment pins thereby working together to assist in holding in place opposing sides of the cable drum at the distal end of the lift arms.

13. The apparatus of claim 10 further comprising two engagement pins attached to the first grasping pad on the medial side of the first lift arm and two engagement pins attached to the second grasping pad on the medial side of the second first lift arm, the two engagement pins on the first grasping pad being insertable between spokes on the first side of the cable drum and the two engagement pins on second grasping pad being insertable between spokes on the second side of the cable drum, the engagement pins thereby working together to assist in holding in place opposing sides of the cable drum at the distal end of the lift arms.

14. The apparatus of claim 10 further comprising a safety lock out device for locking the transverse movement of the lift arms once the drum has been lifted a predetermined distance.

15. The apparatus of claim 10 further comprising an operator station with controls for operating the cable drum handler.

16. The apparatus of claim 10 further comprising a gravity drive having a drive wheel tire for turning the cable drum to spool cable in or out when the cable drum is placed in an operating position on the support structure.

17. The apparatus of claim 16 further comprising an adjustable mechanism that exerts more or less tension on the gravity drive to cause the gravity drive to engage with the cable drum by moving the gravity drive up and down.

18. The apparatus of claim 17 further comprising a variable width locator for laterally moving the drive wheel tire so that different sizes of cable drums may be accommodated on the support structure.

19. The apparatus of claim 10 further comprising stabilizers mountable to the support structure to stabilize the support structure.

20. The apparatus of claim 10 further comprising a vertically mountable light affixed to the support structure when the cable drum handling apparatus is in use.

21. The apparatus of claim 10 further comprising a latch and lower bracket for mounting a banding cart to hold banding for the cabling on the cable drum handling apparatus.

22. A cable handling apparatus comprising:
a receiving bracket adapted for receiving a banding cart that holds banding for cabling to a support structure for the cable handling apparatus when the banding cart that has been tilted upward for mounting unto the cable handling apparatus, the receiving bracket including at least one fin configured to engage the banding cart and mount the banding cart on the cable handling apparatus; and
a latch handle configured to assist in mounting the banding cart on the cable handling apparatus.

23. The apparatus of claim 22 wherein the receiving bracket comprises at least one upper mounting fin and at least one lower mounting fin, the lower mounting fin configured to engage a lower portion of the banding cart when the banding cart is tilted back and pushed forward to rest on the lower mounting fin, and the upper mounting fin configured to engage an upper portion of the banding cart when the banding cart is pivoted upward, the mounting fins thereby operable to mount the banding cart to the support structure.

* * * * *